(12) United States Patent
Cho et al.

(10) Patent No.: US 10,225,458 B2
(45) Date of Patent: Mar. 5, 2019

(54) DISPLAY PANEL AND DISPLAY APPARATUS USING THE SAME

(71) Applicants: HKC Corporation Limited, Shenzhen, Guangdong (CN); Chongqing HKC Optoelectronics Technology Co., Limited, Chongqing (CN)

(72) Inventors: En-Tsung Cho, Chongqing (CN); Fengyun Yang, Chongqing (CN)

(73) Assignees: HKC Corporation Limited, Shenzhen, Guangdong (CN); Chongqing HKC Optoelectronics Technoology Co, Limited, Chongqing (CN)

( * ) Notice: Subject to any disclaimer, the term of this patent is extended or adjusted under 35 U.S.C. 154(b) by 0 days.

(21) Appl. No.: 15/578,501

(22) PCT Filed: Aug. 17, 2017

(86) PCT No.: PCT/CN2017/097882
§ 371 (c)(1),
(2) Date: Nov. 30, 2017

(65) Prior Publication Data
US 2019/0014266 A1    Jan. 10, 2019

(51) Int. Cl.
| | |
|---|---|
| *H04N 5/222* | (2006.01) |
| *G06F 3/041* | (2006.01) |
| *G06F 3/042* | (2006.01) |
| *H04N 5/232* | (2006.01) |
| *H04N 5/225* | (2006.01) |
| *G02F 1/1335* | (2006.01) |
| *G02B 1/04* | (2006.01) |

(Continued)

(52) U.S. Cl.
CPC ....... *H04N 5/232125* (2018.08); *G02B 1/041* (2013.01); *G02F 1/1368* (2013.01); *G02F 1/13318* (2013.01); *G02F 1/133509* (2013.01); *G02F 1/133526* (2013.01); *H04N 5/2257* (2013.01)

(58) Field of Classification Search
CPC ......... H01L 27/14692; H01L 27/14609; H01L 27/14643; H01L 27/14645; H01L 27/3262; H01L 27/14632; G06F 3/0412; G09G 2300/0809; G09G 3/2092; G02F 1/13338; H04N 5/225; H04N 7/144
See application file for complete search history.

(56) References Cited

U.S. PATENT DOCUMENTS 7,535,468 B2 *   5/2009   Uy ................... H01L 27/14601
                                                              345/104
7,773,139 B2 *   8/2010   den Boer .......... H01L 27/14609
                                                              345/82

(Continued)

*Primary Examiner* — Chia Wei A Chen
(74) *Attorney, Agent, or Firm* — Juan Carlos A. Marquez; Marquez IP Law Office, PLLC (57) ABSTRACT

The present invention provides a display panel and a display apparatus using the same. The display panel comprises: a first substrate; a second substrate; a liquid crystal layer disposed between the first substrate and the second substrate; an image sensing module disposed on one side of the second substrate facing the first substrate; a lens array disposed on one side of the first substrate facing the second substrate and on a position corresponding to the image sensing module; and an active switch array disposed on the side of the second substrate facing the first substrate, wherein the image sensing module is configured to receive the focused image light.

20 Claims, 9 Drawing Sheets

(51) Int. Cl.
*G02F 1/133* (2006.01)
*G02F 1/1368* (2006.01)

(56) References Cited

U.S. PATENT DOCUMENTS

| | | | | |
|---|---|---|---|---|
| 9,110,539 | B2* | 8/2015 | Cheng | G06F 3/042 |
| 9,122,349 | B1* | 9/2015 | Chang | G09G 3/3413 |
| 2003/0117369 | A1* | 6/2003 | Spitzer | A61B 3/113 |
| | | | | 345/156 |
| 2008/0115350 | A1* | 5/2008 | Kerr | H01L 27/1214 |
| | | | | 29/832 |
| 2010/0321621 | A1* | 12/2010 | Kikuchi | G02F 1/13338 |
| | | | | 349/122 |
| 2011/0109622 | A1* | 5/2011 | Son | G02F 1/13338 |
| | | | | 345/419 |
| 2011/0157097 | A1* | 6/2011 | Hamada | G02F 1/13338 |
| | | | | 345/175 |
| 2011/0279426 | A1* | 11/2011 | Imamura | G02F 1/13336 |
| | | | | 345/207 |
| 2012/0032926 | A1* | 2/2012 | Douxchamps | G02F 1/13338 |
| | | | | 345/175 |
| 2014/0104543 | A1* | 4/2014 | Li | G02F 1/136277 |
| | | | | 349/84 |
| 2014/0184943 | A1* | 7/2014 | Yang | G02F 1/13338 |
| | | | | 349/12 |
| 2016/0202524 | A1* | 7/2016 | Yun | G02F 1/13338 |
| | | | | 349/12 |
| 2016/0284302 | A1* | 9/2016 | Tomikawa | G09G 3/3614 |
| 2016/0313496 | A1* | 10/2016 | Hirayama | G02B 6/0036 |
| 2017/0123453 | A1* | 5/2017 | Evans | H01L 51/5275 |
| 2017/0123454 | A1* | 5/2017 | Evans | G02F 1/133305 |
| 2017/0251137 | A1* | 8/2017 | Evans | H04N 5/2252 |
| 2018/0151630 | A1* | 5/2018 | Yamaoka | H01L 51/504 |
| 2018/0259816 | A1* | 9/2018 | Chen | G02F 1/136209 |
| 2018/0275451 | A1* | 9/2018 | Chen | G02F 1/133512 |

* cited by examiner

DISPLAY PANEL AND DISPLAY APPARATUS USING THE SAME

BACKGROUND OF THE INVENTION

Field of Invention

The present invention generally relates to a display panel and a display apparatus using the same, and especially to a display panel and a display apparatus, and the display panel and the display apparatus thereof are free of influence of a depth of field and have an adjustable focal length function.

Description of Related Art

A depth of field refers to a relative range for clear imaging around the focus of an image sensing device. In optics, especially in photograph or video field, a depth of field is related to a special distance range for clear imaging (a distance between the nearest and farthest clear image appeared). A general lens can focus light on a fixed distance range for clear imaging, wherein a clear image can be formed. If away from a focus point of the lens within the fixed distance range, an image will be getting blurry. Within the fixed distance range, the blurry degree of the image is invisible to the naked human eye. The foregoing fixed distance range is called a depth of field. If one wants to adjust a depth of field to eliminate a limitation of the depth of field, an image sensing component needs to have an adjustable focal length function.

In a current liquid crystal display panel technology field, a multi-function display is provided by combining an image sensor and a display panel to achieve both image scanning and displaying. A device capable of performing the above mentioned image scanning function includes, for example, a computer camera, computer eyes, etc., used as a kind of video input device and widely used for a video conferencing purpose, a telemedicine purpose and a real-time monitoring purpose. In recent years of the rapid development of Internet technology, the network speed is increased very much, and the photosensitive imaging device is getting mature and widely used in manufacture of video conferencing devices. People can talk to and communicate with each other by transmitting an audio signal or a video signal through the internet by using the video conferencing devices. In addition, people can manage a variety of current digital images, and audio and video information, so that the video conferencing devices play an increasingly important role in people's lives and work. However, an image sensor is limited by its fixed focal length range. Therefore, an imaging effect will be determined by the fixed depth of field and has accordingly a poor performance.

Furthermore, a traditional glass lens or plastic lens has only one fixed focal length, and cannot provide an adjustable zoom function. If one wants to development a device with an adjustable zoom function, a group of traditional lenses must be introduced, and requires more than two traditional lenses combined with each other, and requires at least a voice coil motor or a piezoelectric actuator to regulate the relative distance of the lenses in the group of traditional lenses, so that the equivalent focal length of the lens group can be adjusted. However, the volume of the voice coil motor itself is very large, resulting in a problem of traditional autofocus modules being correspondingly large. Therefore, an application of this kind of traditional lens group is very difficult and limited.

SUMMARY OF THE INVENTION

For resolving the above-mentioned technical problems, the objects of the present invention are to provide a display panel and a display apparatus using the same, especially to a display panel and a display apparatus thereof free of influence of a depth of field but have an adjustable focal length. The display panel and display apparatus of the present invention can improve its performance and usability, and meets the current product requirements of light, thin, and short characteristics.

The objects and technical solutions of the present invention are implemented by combining an adjustable zoom image sensing module (or imaging sensor) and a lens array on a thin film transistor (TFT) liquid crystal display (LCD) panel for according to a lens imaging principle. In the present invention, the image sensing module is combined with a thin film transistor (TFT) substrate for imaging or scanning to achieve an adjustable zoom effect and to overcome the current problem, without limitation or influence of the depth of field. The present lens array is manufactured by a wafer level manufacturing technology with an advantage of small size, and this will not cause a huge impact resulting from a huge system volume, can be applied to current products having light, thin, and short characteristic requirements.

The objects and technical solutions of the present invention can be further implemented by following technical ways and means.

In one perspective, a display panel according to the present invention comprises: a first substrate; a second substrate; a liquid crystal layer disposed between the first substrate and the second substrate; an image sensing module disposed on one side of the second substrate facing the first substrate; a lens array disposed on one side of the first substrate facing the second substrate and on a position corresponding to the image sensing module for focusing an image light on the image sensing module; and an active switch array disposed on the side of the second substrate facing the first substrate for driving liquid crystals distributed in liquid crystal layer; wherein the image sensing module is configured to receive the focused image light and adjusts a focal length of the image sensing module.

In one embodiment of the present invention, the image sensing module is disposed to be parallel to the active switch array.

In one embodiment of the present invention, the image sensing module comprises a light sensor, and the light sensor is a photodiode or a phototransistor.

In one embodiment of the present invention, a material of the light sensor is a narrow bandgap organic or inorganic material with an energy band gap less than 1.12 eV.

In one embodiment of the present invention, a material of the light sensor is a narrow bandgap material with an energy band gap less than 1.12 eV, such as a semiconductor material of amorphous silicon, microcrystalline silicon, polysilicon, or mercury cadmium telluride (HgCdTe).

In one embodiment of the present invention, the lens array is manufactured by a wafer level manufacturing technology.

In one embodiment of the present invention, the material of the lens array can be an optical level glass, polymethyl methacrylate (PMMA) or polycarbonate (PC) resin.

In one embodiment of the present invention, an opaque area is disposed between the first substrate and the lens array for allowing only infrared light to pass through, and wherein a material of the opaque area includes a material of effectively blocking penetration of visible light and allowing only infrared light through.

The objects and technical solutions of the present invention can be further implemented by following technical ways and means.

In another perspective, a display apparatus according to the present invention comprises: a direct-lighting type backlight module or a side-lighting type backlight module; controlling components; and a display panel. The display panel comprises: a first substrate; a second substrate; a liquid crystal layer disposed between the first substrate and the second substrate; an image sensing module disposed on one side of the second substrate facing the first substrate; a lens array disposed on one side of the first substrate facing the second substrate and on a position corresponding to the image sensing module for focusing an image light on the image sensing module; and an active switch array disposed on the side of the second substrate facing the first substrate for driving liquid crystals distributed in liquid crystal layer; wherein the image sensing module is configured to receive the focused image light and adjusts a focal length of the image sensing module.

In one embodiment of the present invention, the image sensing module is disposed to be parallel to the active switch array.

In one embodiment of the present invention, the image sensing module includes a light sensor.

In one embodiment of the present invention, the light sensor is a photodiode.

In one embodiment of the present invention, the light sensor is a phototransistor.

In one embodiment of the present invention, a material of the light sensor is a narrow bandgap organic or a narrow bandgap inorganic material with an energy band gap less than 1.12 eV.

In one embodiment of the present invention, the lens array is manufactured by a wafer level manufacturing technology.

In one embodiment of the present invention, the material of the lens array can be an optical level glass.

In one embodiment of the present invention, the material of the lens array can be a polymethyl methacrylate (PMMA).

In one embodiment of the present invention, the material of the lens array can be a polycarbonate (PC) resin.

In one embodiment of the present invention, an opaque area is disposed between the first substrate and the lens array for allowing only infrared light to pass through.

In another perspective, the present invention provides a display panel comprises: a first substrate; a second substrate; a liquid crystal layer disposed between the first substrate and the second substrate; an image sensing module disposed on one side of the second substrate facing the first substrate, wherein the image sensing module includes a light sensor; a lens array disposed on one side of the first substrate facing the second substrate and on a position corresponding to the image sensing module for focusing an image light on the image sensing module, wherein the material of the lens array includes an optical level glass, and the lens array is manufactured by a wafer level manufacturing technology; and an active switch array disposed on the side of the second substrate facing the first substrate, wherein the active switch array is disposed to be parallel to the image sensing module; wherein an opaque area is disposed between the first substrate and the lens array for allowing only infrared light to pass through, and the image sensing module is configured to receive the focused image light and adjusts a focal length of the image sensing module.

According to the improvements of the present application, a lens array is additionally disposed and combined with an image sensing module in a TFT liquid crystal display panel to achieve an adjustable zoom effect. Therefore, the present TFT liquid crystal display panel can be not influenced or limited by a depth of field but overcome the above-mentioned problem effectively. Furthermore, the present TFT liquid crystal display panel can achieve the function of image recognition and vein sensing.

DESCRIPTION OF THE PREFERRED EMBODIMENTS

The drawings as referred to throughout the description of the present invention are examples for implementing the objects of the present invention. The orientation words or terms used in the description of the present invention, such as "above", "under", "forward", "backward", "left", "right", "inner", "outer", "side", etc. are examples in the drawings for illustrative purpose only, or just show the interrelations between the components, but not to be construed as limitations to the scope of the present invention.

The drawings and the description of the present invention are deemed to be examples but not limitations essentially. In the drawings, components or elements having similar or same structure are marked with the same numbers. In addition, sizes and thicknesses of every component or element are just examples, but not drawn according to actual scale and not read as limitations to the scope of the present invention.

In drawings of the present invention, sizes and thicknesses of layers, films, panels, or regions are emphasized for clearness, easy to describe and easy to understand. Therefore, some layers, films, or regions are emphasized but not drawn according to their actual scales. It is to be understood that, for example, when one of the components of layers, films, regions, or substrate are "on" another component of layers, films, regions, or substrate, the one of the components of layers, films, regions, or substrate could be adjacent on another component of layers, films, regions, or substrate directly, or there could be other inter-components of layers, films, regions, or substrate disposed therebetween.

Furthermore, in the description of the present invention, a word "comprising" or "including" is construed to comprise or include the related components but not exclude other components, except there is clearly opposite word or description in the present invention. And, in the description of the present invention, a word "on" can be construed to be above or under a target component, but not only construed to be on a top of the target component in vertical or gravity direction.

For further clarifying the technical solutions or functions of the present invention to implement the objects of the present invention, a display panel and a display apparatus using the same, and their specific implementations, structures, features and functions, according to a preferred embodiment of the present invention will be apparent from the following detailed description with reference to the accompanying drawings.

A liquid crystal display (LCD) includes liquid crystals disposed between two glass substrates, wherein the liquid crystals are applied with an electric field, so that an image or numbers can be shown. The liquid crystals are composed of a kind of material between liquid and solid. An image can be shown by controlling the light passing through the liquid crystal display (LCD) panel, wherein liquid crystals are disposed within the liquid crystal display (LCD) uniformly.

Figure 1A:
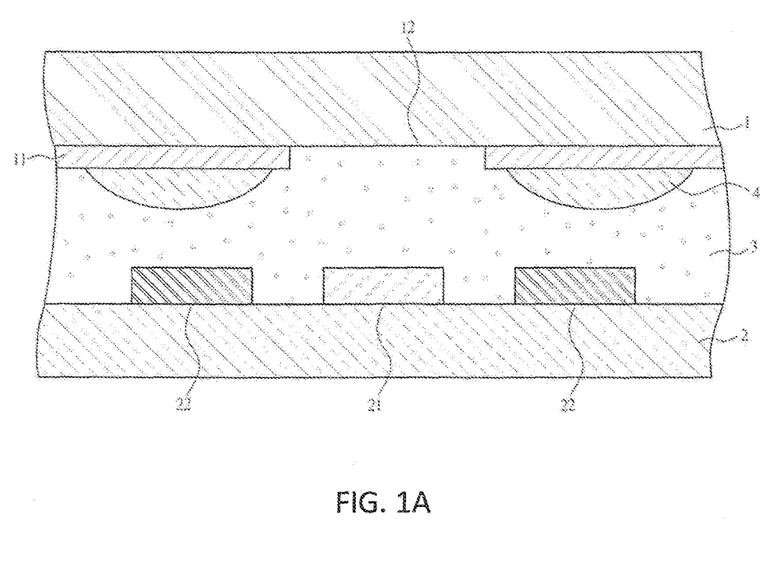
FIG. 1A shows an adjustable zoom display panel according to one embodiment of the present invention.

FIG. 1A shows an adjustable zoom display panel according to one embodiment of the present invention. Please refer to FIG. 1A, in one embodiment of the present invention, the display panel comprises: a first substrate 1 and a second substrate 2 disposed up and down oppositely to each other, wherein a liquid crystal layer 3 is disposed between the first substrate 1 and the second substrate 2, and the liquid crystal layer 3 includes liquid crystals distributed uniformly; an image sensing module 22 disposed on one side of the second substrate 2 facing the first substrate 1; a lens array 4 disposed on one side of the first substrate 1 facing the second substrate 2, wherein the lens array 4 is corresponding to a position of the image sensing module 22 to focus an image light to the image sensing module 22; an active switch array 21 disposed on the side of the second substrate 2 facing the first substrate1 for driving the liquid crystals distributed in the liquid crystal layer 3 uniformly, wherein the image sensing module 22 is configured to receive an image light focused by the lens array 4.

In one embodiment of the present invention, an opaque area 11 is further disposed between the first substrate 1 and the lens array 4, wherein a material of the opaque area 11 includes a material of effectively blocking penetration of visible light and allowing only infrared light through, as shown in FIG. 1A.

As shown in FIG. 1A, the present display panel comprises: the first substrate 1, the second substrate 2, the lens array 4, the active switch array 21 and the image sensing module 22. For explanation's convenience, only one active switch array 21 and one image sensing module 22 are shown in FIG. 1A, but it is not limited that the active switch array 21 and image sensing module 22 can only include one component respectively. In addition, the first substrate 1 can be a color filter (CF) side substrate, the second substrate 2 can be a thin film transistor (TFT) side substrate, and the liquid crystal layer 3 is disposed between the first substrate 1 and the second substrate 2.

In foregoing embodiment of the present invention, the image sensing module 22 and the active switch array 21 are disposed to be parallel to each other, and the lens array 4 is disposed on the side of the first substrate 1 facing the second substrate 2 and corresponding to the position of the image sensing module 22. The lens array 4 performs a lens refraction function to focus an image light to the image sensing module 22.

Furthermore, a transparent area 12 is disposed in the center of the side facing the second substrate 2 for displaying an image, and an opaque area 11 is disposed on left or right side of the transparent area 12, as shown in FIG. 1A, wherein a material of the opaque area 11 includes a material of allowing only a specific band of light (ex: infrared light) through. For example, in one embodiment of the present invention, the opaque area 11 is disposed between the first substrate 1 and the lens array 4, wherein the material of the opaque area 11 includes a material of effectively blocking penetration of visible light and allowing only infrared light through.

In an above-mentioned unresolved problem, an optical component can only one focal length, so that an imaging effect will be affected by a depth of field and has a poor performance. The present invention can overcome this problem by disposing the lens array 4 on one side of the opaque area 11 facing the second substrate 2, as shown in FIG. 1A. The lens array 4 can combine with the image sensing module 22 corresponding to and under the lens array 4 to form an image sensing unit with an adjustable zoom function, so that the foregoing problem that an imaging effect is affected by a depth of field can be overcome and an imaging quality can be improved. In addition, in one embodiment of the present invention, the image sensing module 22 can be formed on an array substrate, and other circuits of central processing unit (CPU), random access memory (RAM), flash memory, digital signal processor (DSP), compression coding processor, and image sensor, etc. can also be formed on the same array substrate respectively. It is noted when forming the above mentioned circuits directly on the second substrate, lithography processes of an exposure process and a development process, etc. can be performed with a manufacturing process of an array substrate of liquid crystal display (LCD) panel simultaneously, wherein the second substrate can be, but not limited to, a monocrystalline (单晶硅) silicon substrates, low temperature polysilicon substrates, high temperature polysilicon substrates, or other substrates capable of meeting the high mobility of peripheral integrated circuits.

The present lens array 4 is manufactured by a wafer level manufacturing technology with an advantage of small size, and such will not cause a huge impact resulting from a huge system volume. In addition, the material of the lens array 4 is selected from an optical level translucent material with an advantage of good optical performance. That is, in one embodiment of the present invention, the lens array 4 is manufactured by a wafer level manufacturing technology, and the material of the lens array 4 can be an optical level glass, polymethyl methacrylate (PMMA) or polycarbonate (PC) resin.

Another objects and technical solutions of the present invention are implemented by providing an image sensing display apparatus. The structure of the present image sensing display apparatus can combine a foregoing display panel and a backlight module. For example, the present image sensing display apparatus comprises: a direct-lighting type backlight module or a side-lighting type backlight module, and the image sensing display panel.

Figure 1B:
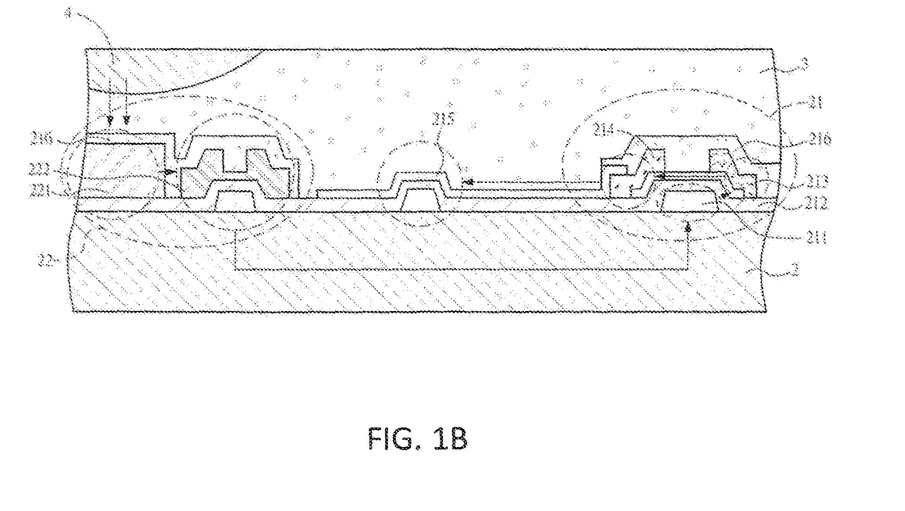
FIG. 1B shows a path diagram of an image sensing signal converted to an electrical signal according to one embodiment of the present invention.

Please further refer to FIG. 1B, it shows a path diagram of an image sensing signal converted to an electrical signal according to one embodiment of the present invention. The present image sensing display panel structure comprises: a second substrate 2, an active switch array 21 disposed on the second substrate 2, and an image sensing module 22 disposed on the second substrate 2. The image sensing module 22 is disposed on one side of the second substrate 2 facing the first substrate 1, wherein the image sensing module 22 has a light sensor 221 for receiving an image light focused by the lens array 4 and converting into a current. The current then flows to a photo-electric switch 222 nearby to form an electrical signal, and the electrical signal is transmitted to an active switch array 21 for controlling the liquid crystal layer 3 to generate an image. The active switch array 21 has a gate switch 211 for receiving an electrical signal transmitted from the photo-electric switch 221, and controlling a current of driving voltage of liquid crystals to flow from a source electrode 213 to a drain electrode 214. Then the current flows to a pixel electrode 215 and the first substrate 1, as shown in FIG. 1A, to form an electric field to control rotating of the liquid crystals in the liquid crystal layer 3. An insulating protection layer 212 is disposed electrically isolated on one side of the gate switch 211 facing the first substrate 1, and an insulating protection layer 216 is disposed above the thin film transistor array 21 and the image sensing module 22 and is electrically isolated from the liquid crystals.

In this embodiment of the present invention, the image sensing module 22 comprises a light sensor 221, wherein the light sensor 221 can be a photodiode or a phototransistor, and a material of the light sensor 221 can be selected from narrow bandgap organic or inorganic materials with an energy band gap less than 1.12 eV. For example, the material of the light sensor 221 can be a light tube composed of amorphous silicon, microcrystalline silicon, polysilicon, or a semiconductor material such as Hg, Cd, and Te, etc.

Figure 1C:
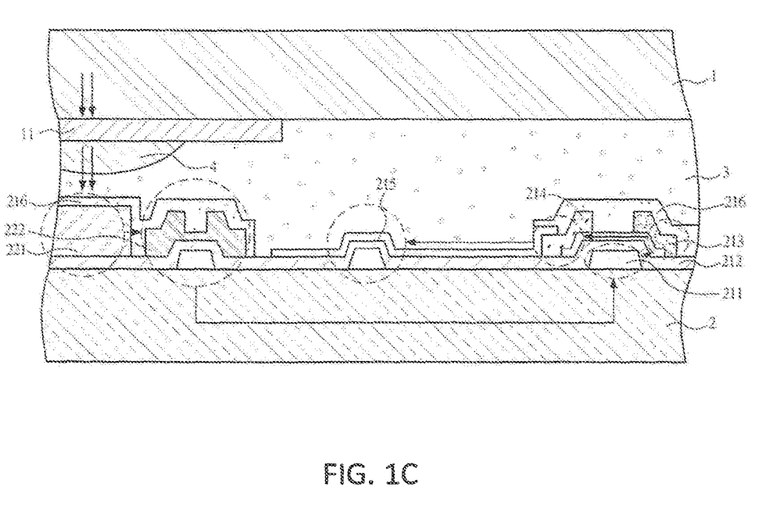
FIG. 1C shows a path diagram of an image sensing signal converted to an electrical signal according to another embodiment of the present invention.

Please refer to FIG. 1C, it shows a path diagram of an image sensing signal converted to an electrical signal according to another embodiment of the present invention. In the embodiment of FIG. 1C, a transparent area 12 and an opaque area 11 allowing only a specific band of light through are disposed on the first substrate 1 of the image sensing display panel, as shown FIG. 1A.

The image sensing display panel structure of FIG. 1C comprises a first substrate 1 having a transparent area 12 (as shown in FIG. 1A) and an opaque area 11 allowing only infrared light through thereon, and a second substrate 2 having an active switch array 21 and an image sensing module 22 thereon (as shown in FIG. 1B). The image sensing module 22 is disposed on one side of the second substrate 2 facing the first substrate 1 and under an area corresponding to the opaque area 11. The image sensing module 22 has a light sensor 221 for receiving an infrared light image from outside through the opaque area 11 and converting into a current. The current then flows to a photo-electric switch 222 nearby to form an electrical signal, and the electrical signal is transmitted to an active switch array 21 (as shown in FIG. 1B) for controlling the liquid crystal layer 3 to generate an image.

In foregoing embodiment of the present invention, the light sensor 221 can be a photodiode or a phototransistor, and a material of the light sensor 221 can be selected from narrow bandgap organic or inorganic materials with an energy band gap less than 1.12 eV. For example, the material of the light sensor 221 can be a light tube composed of a semiconductor material such as amorphous silicon, microcrystalline silicon, polysilicon, or mercury cadmium telluride (HgCdTe), etc. Since the present light sensor 221 mainly receives an infrared light and converts into a current, in this embodiment of the present invention, the opaque area 11 is disposed allowing only infrared light through, as shown in FIG. 1A. Therefore, the image sensing module 22 can receive an image light passing through the opaque area 11 and focused by the lens array 4, and it will not be affected by external ambient light or backlight interference to influence the sensing sensitivity of the present light sensor 221.

Therefore, as shown in FIG. 1C, in foregoing embodiment of the present invention, the active switch array 21 has a gate switch 211 for receiving an electrical signal transmitted and converted from an infrared light received by the photo-electric switch 221. The active switch array 21 controls a current of driving voltage of liquid crystals to flow from a source electrode 213 to a drain electrode 214. Then the current flows to a pixel electrode 215 and the first substrate 1 to form an electric field to control rotating of the liquid crystals in the liquid crystal layer 3. An insulating protection layer 212 is disposed to be electrically isolated on one side of the gate switch 211 facing the first substrate 1, and an insulating protection layer 216 is disposed above the thin film transistor array 21 and the image sensing module 22 and is electrically isolated from the liquid crystals.

The present invention additionally disposeds a lens array and combines with an image sensing module in a TFT liquid crystal display panel to achieve an adjustable zoom effect. Therefore, the present TFT liquid crystal display panel cannot be limited by a depth of field to overcome the above-mentioned problem effectively. Furthermore, the present TFT liquid crystal display panel can achieve the function of image recognition and vein sensing.

Figure 2A:
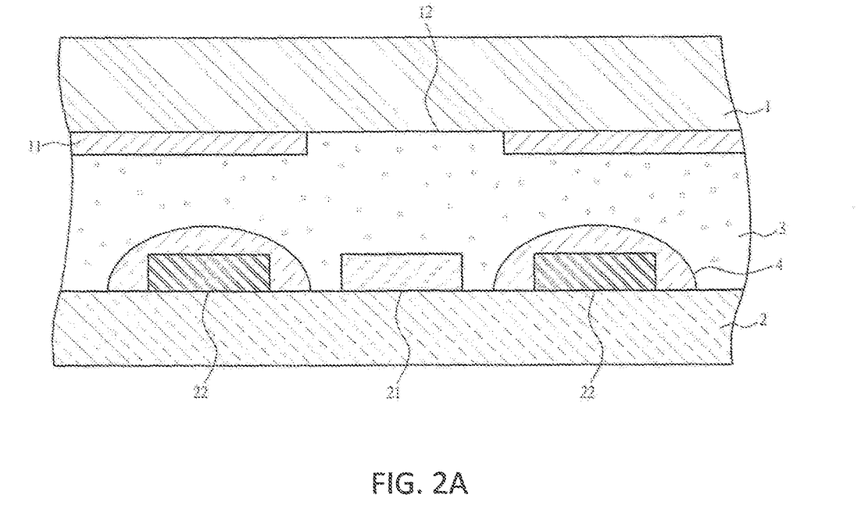
FIG. 2A shows an adjustable zoom display panel according to another embodiment of the present invention.
Figure 2B:
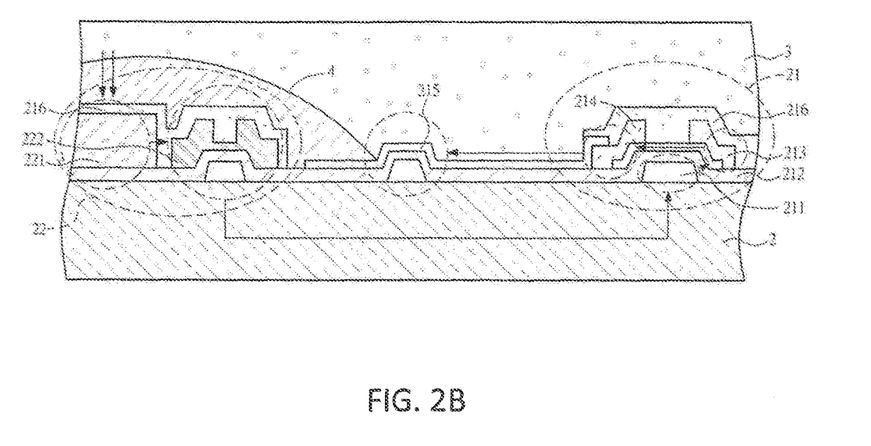
FIG. 2B shows a path diagram of an image sensing signal converted to an electrical signal according to another embodiment of the present invention.
Figure 2C:
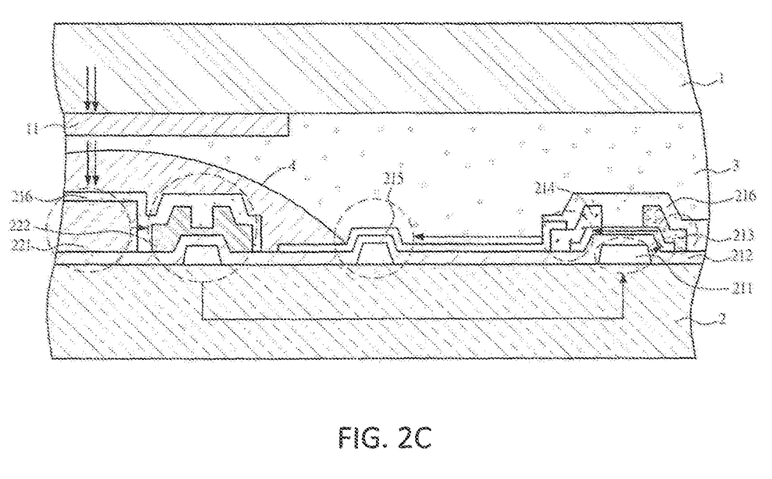
FIG. 2C shows a path diagram of an image sensing signal converted to an electrical signal according to another embodiment of the present invention.

And, please refer to FIGS. 2A to 2C, they illustrate that the present invention additionally disposes a lens array and combines with an image sensing module in a TFT liquid crystal display panel to achieve an adjustable zoom effect. The lens array 4 is disposed on the image sensing module 22 and on the side of the second substrate 2 facing the first substrate1. An image light is focused on the image sensing module 22 by the lens array 4. As shown in FIG. 2B, the image sensing module 22 has a light sensor 221 for receiving an image light focused by the lens array 4 and converting into a current. The current then flows to a photo-electric switch 222 nearby to form an electrical signal, and the electrical signal is transmitted to an active switch array 21 for controlling the liquid crystal layer 3 to generate an image. The active switch array 21 has a gate switch 211 for receiving an electrical signal transmitted from the photo-electric switch 221, and controlling a current of driving voltage of liquid crystals to flow from a source electrode 213 to a drain electrode 214. Then the current flows to a pixel electrode 215 and the first substrate 1, as shown in FIG. 2A, to form an electric field to control rotating of the liquid crystals in the liquid crystal layer 3. An insulating protection layer 212 is disposed to be electrically isolated on one side of the gate switch 211 facing the first substrate 1, and an insulating protection layer 216 is disposed above the thin film transistor array 21 and the image sensing module 22 and is electrically isolated from the liquid crystals. In FIG. 2C, an opaque area 11 is disposed between the first substrate 1 and the lens array 4 for filtering, screening and isolating a specific band of light.

Figure 3A:
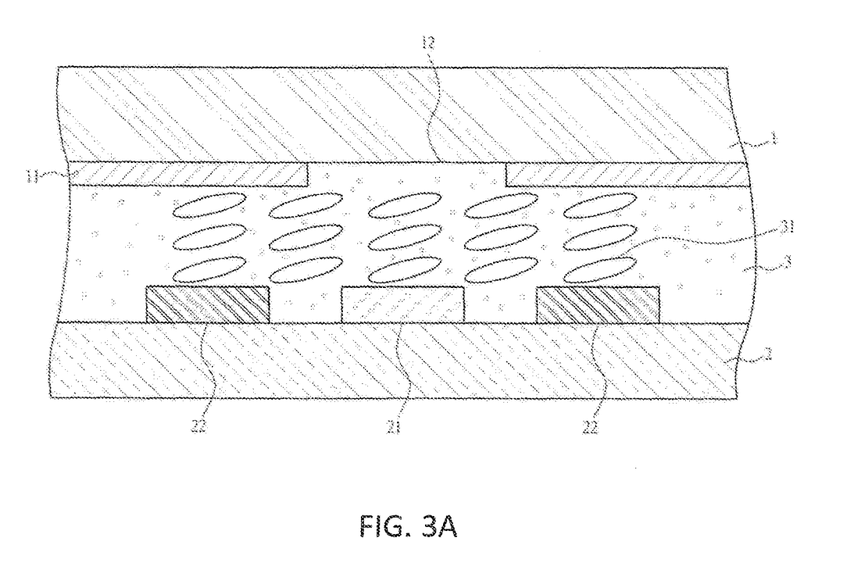
FIG. 3A shows an adjustable zoom display panel according to another embodiment of the present invention.
Figure 3B:
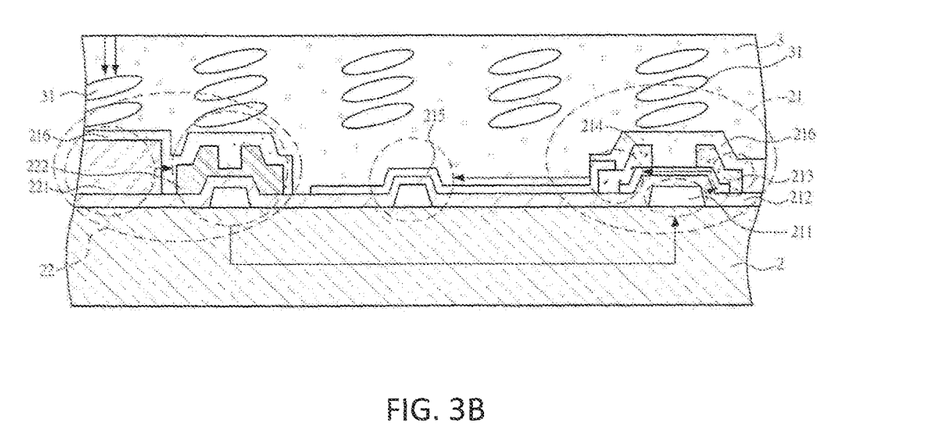
FIG. 3B shows a path diagram of an image sensing signal converted to an electrical signal according to another embodiment of the present invention.
Figure 3C:
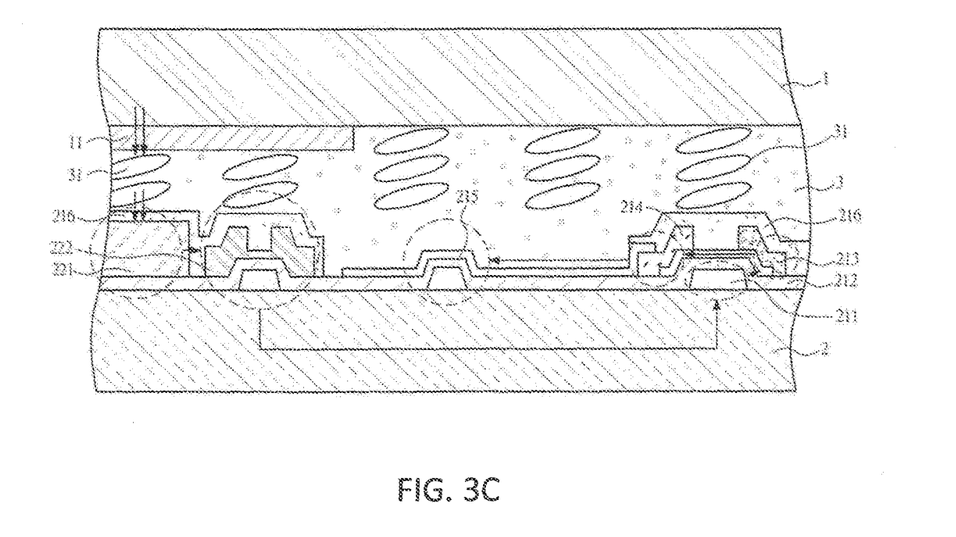
FIG. 3C shows a path diagram of an image sensing signal converted to an electrical signal according to another embodiment of the present invention.

Further, please refer to FIGS. 3A to 3C, the present invention uses a shape of liquid crystals having a thick middle and a thin edge. The liquid crystals can be rotated to change angles to achieve an adjustable zoom effect by changing and driving an electric field on the liquid crystals. In this embodiment of the present invention, the present display panel structure does not additionally dispose a lens array 4 (as shown in FIGS. 1A and 2A). Instead, the present display panel structure drives the liquid crystals 31 to change angles by changing and driving an electric field on the liquid crystals 31 in the liquid crystal layer 3, and an image light can be focused on the image sensing module 22. Specifically, the present invention fills the liquid crystals 31 between the first substrate 1 (color filter substrate) and the second substrate 2 (active switch array substrate) by thin film transistor liquid crystal display (TFT-LCD) technology to form a plane type liquid crystal lens. The plane type liquid crystal lens can use birefringence characteristics of liquid crystals 31 molecular, and control the light beam to focus or diverge for performing a traditional lens (plastic lens or glass lens) function by changing the electric field distribution characteristics. As shown in FIG. 3B, the image sensing module 22 has a light sensor 221 for receiving an image light focused by the liquid crystals 31 and converting into a current. The current then flows to a photo-electric switch 222 nearby to form an electrical signal, and the electrical signal is transmitted to an active switch array 21 for controlling the liquid crystal layer 3 to generate an image. The active switch array 21 has a gate switch 211 for receiving an electrical signal transmitted from the photo-electric switch 221, and controlling a current of driving voltage of liquid crystals to flow from a source electrode 213 to a drain electrode 214. Then the current flows to a pixel electrode 215 and the first substrate 1, as shown in FIG. 3A, to form an electric field to control rotating of the liquid crystals in the liquid crystal layer 3. An insulating protection layer 212 is disposed to be electrically isolated on one side of the gate switch 211 facing the first substrate 1, and an insulating protection layer 216 is disposed above the thin film transistor array 21 and the image sensing module 22 and is electrically isolated from the liquid crystals. In FIG. 3C, an opaque area 11 is disposed between the first substrate 1 and the liquid crystal layer 3 for filtering, screening and isolating a specific band of light. Compared with the current lens, the present liquid crystal lens has the following advantages: (1) Current lens can only enlarge part of an image by a digital processing to achieve a visible adjustable zoom effect but such is not a physically optical adjustable focal length effect, while the present liquid crystal lens can change arrangement directions of liquid crystals by changing an operation electric field to really achieve an effect of physically adjusting a focal length, wherein a great advantage is: the present invention can meet the current product requirements of light, thin, and short characteristics, and achieve an adjustable zoom effect in a small space; (2) Current lens are designed to have an apparent protrusion shape, but such is not suitable to monitor or protect secret information, while the present plane liquid crystal lens using liquid crystal molecule characteristics looks the same as a general liquid crystal display (LCD) panel, and this is good to concealing for monitoring or protecting secret information.

Please refer to FIGS. 1A to 3C simultaneously, in one embodiment of the present invention, a display apparatus comprises: a direct-lighting type backlight module or a side-lighting type backlight module; controlling components; and display panels of foregoing embodiments, wherein the display apparatus can be a twisted nematic (TN) type display panel; a super twisted nematic (STN) type display panel; a optically compensated birefringence (OCB) type display panel; a vertical alignment (VA) type display panel; a curved liquid crystal display panel, etc., but the display panels are not limited in the above-mentioned display panels. In foregoing embodiments of the present invention, a present lens can be formed and adhered to a substrate of display panel (ex: a present lens array), or be distributed within a liquid crystal layer (ex: a liquid crystal lens), and this does not occupy a large area or an outer bezel area, and a present plane lens can perform a function of physically adjusting a focal length and have a strong image capturing ability.

"In some embodiments of the present invention" and "In a variety of embodiments of the present invention" are used repeatedly through the description. They usually mean different embodiments. However, they can also mean the same embodiments. "Comprising", "having" and "including" are synonyms, except it is noted to be different or has other meaning before and after its description.

The present invention has been described in considerable detail with reference to certain preferred embodiments thereof. It should be understood that the description is for illustrative purpose, not for limiting the scope of the present invention. Those skilled in this art can readily conceive simple or equivalent variations and modifications, which are still within the spirit of the present invention.

What is claimed is:

1. A display panel, comprising:
    a first substrate;
    a second substrate;
    a liquid crystal layer disposed between the first substrate and the second substrate;
    an image sensing module disposed on one side of the second substrate facing the first substrate;
    a lens array disposed on one side of the first substrate facing the second substrate and on a position corresponding to the image sensing module for focusing an image light on the image sensing module; and
    an active switch array disposed on the side of the second substrate facing the first substrate;
    wherein the image sensing module is configured to receive the focused image light and adjust a focal length of the image sensing module.

2. The display panel according to claim 1, wherein the image sensing module is disposed to be parallel to the active switch array.

3. The display panel according to claim 1, wherein the image sensing module includes a light sensor.

4. The display panel according to claim 3, wherein the light sensor is a photodiode or a phototransistor.

5. The display panel according to claim 3, wherein a material of the light sensor is a narrow bandgap organic or inorganic material with an energy band gap less than 1.12 eV.

6. The display panel according to claim 1, wherein the lens array is manufactured by a wafer level manufacturing technology.

7. The display panel according to claim 6, wherein the material of the lens array includes an optical level glass, polymethyl methacrylate (PMMA) or polycarbonate (PC) resin.

8. The display panel according to claim 1, wherein an opaque area is disposed between the first substrate and the lens array for allowing only infrared light to pass through.

9. A display apparatus, comprising:
    a backlight module;
    controlling components; and
    a display panel, comprising:
        a first substrate;
        a second substrate;

a liquid crystal layer disposed between the first substrate and the second substrate;

an image sensing module disposed on one side of the second substrate facing the first substrate;

a lens array disposed on one side of the first substrate facing the second substrate and on a position corresponding to the image sensing module for focusing an image light on the image sensing module; and an active switch array disposed on the side of the second substrate facing the first substrate;

wherein the image sensing module is configured to receive the focused image light and adjusts a focal length of the image sensing module.

10. The display apparatus according to claim 9, wherein the image sensing module is disposed to be parallel to the active switch array.

11. The display apparatus according to claim 9, wherein the image sensing module includes a light sensor.

12. The display apparatus according to claim 11, wherein the light sensor is a photodiode.

13. The display apparatus according to claim 11, wherein the light sensor is a phototransistor.

14. The display apparatus according to claim 11, wherein a material of the light sensor is a narrow bandgap organic or inorganic material with an energy band gap less than 1.12 eV.

15. The display apparatus according to claim 9, wherein the lens array is manufactured by a wafer level manufacturing technology.

16. The display apparatus according to claim 15, wherein the material of the lens array includes an optical level glass.

17. The display apparatus according to claim 15, wherein the material of the lens array includes a polymethyl methacrylate (PMMA).

18. The display apparatus according to claim 15, wherein the material of the lens array includes a polycarbonate (PC) resin.

19. The display apparatus according to claim 9, wherein an opaque area is disposed between the first substrate and the lens array for allowing only infrared light to pass through.

20. A display panel, comprising:

a first substrate;

a second substrate;

a liquid crystal layer disposed between the first substrate and the second substrate;

an image sensing module disposed on one side of the second substrate facing the first substrate, wherein the image sensing module includes a light sensor;

a lens array disposed on one side of the first substrate facing the second substrate and on a position corresponding to the image sensing module for focusing an image light on the image sensing module, wherein the material of the lens array includes an optical level glass, and the lens array is manufactured by a wafer level manufacturing technology; and an active switch array disposed on the side of the second substrate facing the first substrate, wherein the active switch array is disposed to be parallel to the image sensing module;

wherein an opaque area is disposed between the first substrate and the lens array for allowing only infrared light to pass through, and the image sensing module is configured to receive the focused image light and adjusts a focal length of the image sensing module.

* * * * *